United States Patent [19]

Hergenrother et al.

[11] Patent Number: 5,599,993
[45] Date of Patent: Feb. 4, 1997

[54] PHENYLETHYNYL AMINE

[75] Inventors: Paul M. Hergenrother, Yorktown; Robert G. Bryant, Poquoson; Brian J. Jensen, Williamsburg; Stephen J. Havens, Newport News, all of Va.

[73] Assignee: The United States of America as represented by the Administrator of the National Aeronautics and Space Administration, Washington, D.C.

[21] Appl. No.: 376,167

[22] Filed: Jan. 20, 1995

Related U.S. Application Data

[62] Division of Ser. No. 209,512, Mar. 3, 1994, Pat. No. 5,412,066.

[51] Int. Cl.$^6$ ............ C07C 225/22; C07C 217/90; C07C 317/36

[52] U.S. Cl. ............ 564/328; 564/315; 564/329; 564/430

[58] Field of Search ............ 564/328, 329, 564/430, 315

[56] References Cited

U.S. PATENT DOCUMENTS 5,145,937  9/1992  Hergenrother ............ 564/315 X

OTHER PUBLICATIONS

Bryant et al, Polymer Prepr., vol. 34, No. 1 (Mar. 5, 1993) pp. 566–567.

*Primary Examiner*—Richard L. Raymond
*Attorney, Agent, or Firm*—George F. Helfrich

[57] ABSTRACT

Four phenylethynyl amine compounds—3 and 4-aminophenoxy-4'-phenylethynylbenzophenone, and 3 and 4-amino-4'-phenylethynylbenzophenone—were readily prepared and were used to endcap imide oligomers. Phenylethynyl-terminated amide acid oligomers and phenylethynyl-terminated imide oligomers with various molecular weights and compositions were prepared and characterized. These oligomers were cured at 300° C. to 400° C. to provide crosslinked polyimides with excellent solvent resistance, high strength and modulus and good high temperature properties. Adhesive panels, composites, films and moldings from these phenylethynyl terminated imide oligomers gave excellent mechanical performance.

2 Claims, 1 Drawing Sheet

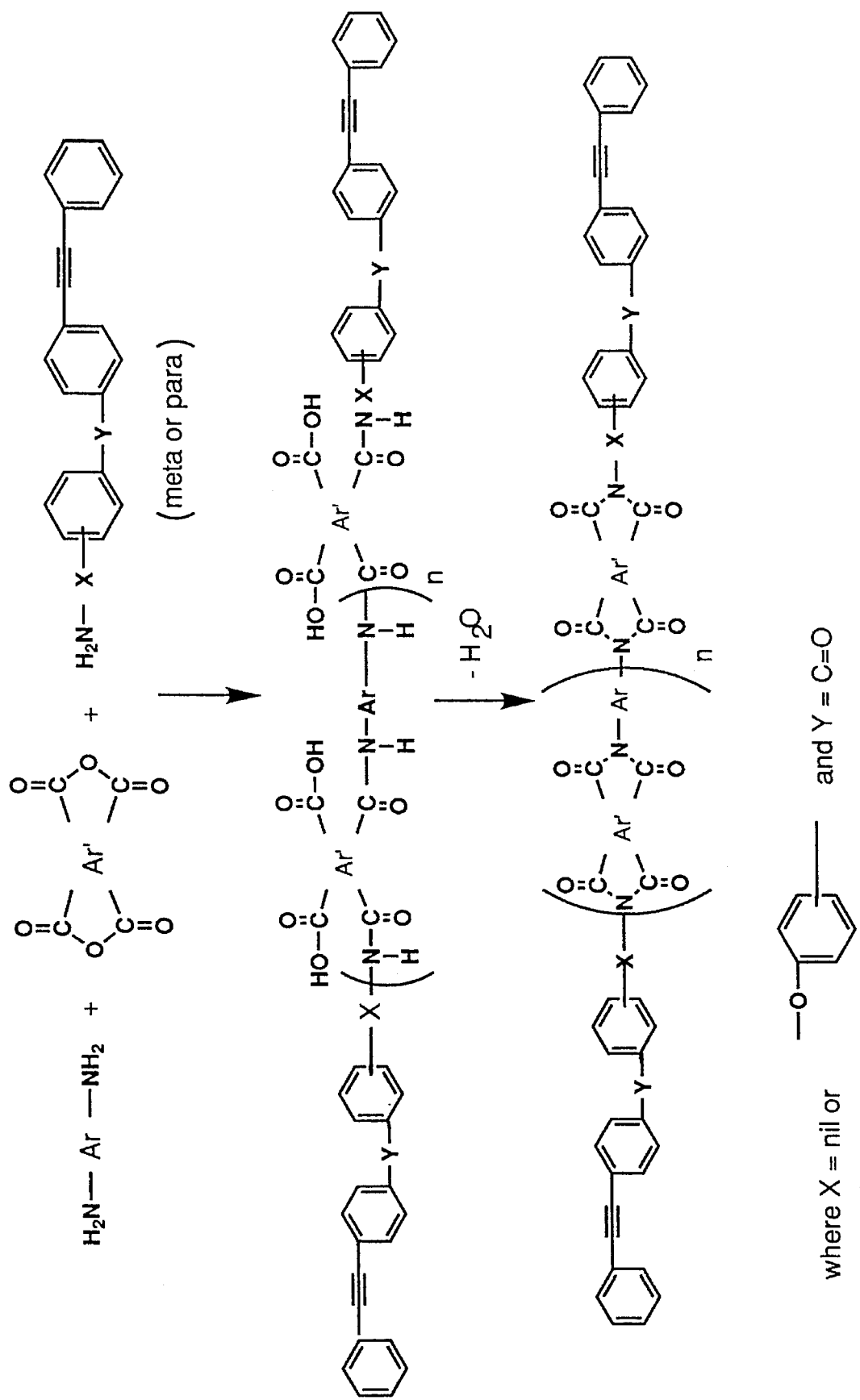

PHENYLETHYNYL AMINE

ORIGIN OF THE INVENTION

The invention described herein was jointly made by employees of the United States Government and during the performance of work under a NASA contract and is subject to the provisions of Section 305 of the National Aeronautics and Space Act of 1958, as amended, Public Law 85-568 (72 Stat. 435; 42 USC 2457).

This is a divisional of application Ser. No. 08/209,512 filed on Mar. 3, 1994, now U.S. Pat. No. 5,412,066.

BACKGROUND OF THE INVENTION

1. Field of the Invention

The present invention relates generally to polyimides, especially imide oligomers. It relates particularly to a series of phenylethynyl-terminated imide oligomers which can be thermally cured to resins that are useful as adhesives, composite matrices, moldings, films and coatings. The invention also relates particularly to a series of amino phenylethynyl compounds used to terminate the imide oligomers.

2. Description of Related Art

Polyimides are condensation polymers that can be prepared by various routes. The most popular route involves the reaction of an aromatic dianhydride with an aromatic diamine. The intermediate polyamide acid is either thermally or chemically cyclodehydrated to form the polyimide which has a repeat unit of the general type

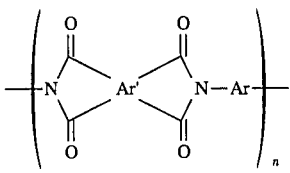

where Ar' is a tetravalent aromatic radical, which can be as simple as 1,2,4,5-tetrasubstituted benzene, or it may be a bis-4-(o-diphenylene) having the general structure

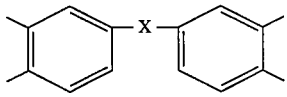

where X=nil, O, S, $SO_2$, C=O, etc. Ar' may be any other appropriate tetravalent radical. Ar is a divalent aromatic radical which may be 1,3-phenylene, 1,4-phenylene, 4,4'-oxydiphenylene, 4,4'-biphenylene, 4,4'-thiodiphenylene, 4,4'-carbonyldiphenylene, 4,4'-methylenediphenylene or any other appropriate divalent radical.

Synthesis and characterization of polyimides has been extensively reported in the literature. The preparation of aromatic polyimides by reaction of an aromatic dianhydride with an aromatic diamine, followed by thermal cyclization was first reported in 1963 [G. M. Bower and L. W. Frost, *J. Polym. Sci.* A1, 3134 (1963)] with patents awarded in 1965 (W. M. Edwards, U.S. Pat. Nos. 3,179,614 and 3,179,634 and A. L. Endrey, U.S. Pat. Nos. 3,179,631 and 3,179,633). Several reviews on polyimides have been published [C. E. Sroog, "Polyimides" in *Encyclopedia of Polymer Sci. and Technology* (H. F. Mark, N. G. Gaylord and N. M. Bikales, ed.) Interscience Pub., New York, 1969, Vol. 11, pp. 247–272; N. A. Adrova, M. I. Bessonov, L. A. Lauis and A. P. Rudakov, Polyimides, Technomic Pub. Co., Inc., Stamford, Conn., 1970].

Wholly aromatic polyimides are known for their exceptional thermal, thermooxidative and chemical resistance, but are generally difficult to process as structural adhesives or composite matrices. Several polyimides such as Kapton® (DuPont), PI-2080 (Dow Chemical, licensed to Lenzing), XU-218™ (Ciba-Geigy), Ultem® (General Electric) and LaRC™-TPI (Mitsui Toatsu) are commercially available and used as fibers, films, moldings, adhesives or composite matrices.

The incorporation of ethynyl groups in polyimides has been reported in the literature, typically as terminal groups to yield acetylene-terminated imide oligomers (ATI). Thermid-600™, an oligoimide with acetylene end groups was first developed at the Hughes Aircraft Co. [N. Bilow, A. L. Landis and L. J. Miller, U.S. Pat. No. 3,845,018 (1974); A. L. Landis, N. Bilow, R. H. Boschan, R. E. Lawrence and T. J. Aponyi, *Polym. Prepr.*, 15, 537(1974); N. Bilow and A. L. Landis, *Natl. SAMPE Tech. Conf. Ser.*, 8, 94(1976)]. Several reviews on polyimides or acetylene-terminated prepolymers are published and discuss other acetylene containing polyimides [P. M. Hergenrother, in (H. Mark, ed.) *Encyclopedia of Polymer Science and Engineering*, 2nd. ed., vol. 1, John Wiley and Sons, Inc., New York, 61(1985); P. M. Hergenrother in (H. Mark, ed.) *Encyclopedia of Polymer Science and Engineering*, 2nd. ed., vol. 7, John Wiley and Sons, Inc., New York, 639(1987); T. Takekoshi, in (C. G. Overberger, ed.) *Advances in Polymer Science*, 2(1990)]. Polyimides containing pendent ethynyl groups have been reported but one reference contains an abstract only with no experimental details or polymer properties [F. W. Harris, S. M. Padaki and S. Varaprath, *Polym. Prepr.*, 21(1), 3(1980)]. Other disclosures on polyimides containing pendent ethynyl groups contain detailed experimental information and polymer properties [B. J. Jensen, P. M. Hergenrother and G. Nwokogu, *Polym. Prepr.*, 33(1), 914 (1992) and B. J. Jensen, P. M. Hergenrother and G. Nwokogu, *Polymer*, 34(3), 630, (1993)].

SUMMARY OF THE INVENTION

The primary object of the present invention is to provide a series of phenylethynyl-terminated imide oligomers of various molecular weights that can be thermally cured to provide materials that are crosslinked, insoluble in common organic solvents and have excellent high temperature mechanical properties. Another object is to provide novel amino phenylethynyl compounds that can be used to terminate oligomers.

According to the present invention, the foregoing and additional objects were obtained by synthesizing phenylethynyl-terminated imide oligomers with different polymer backbones and different molecular weights. After curing 1 hour at 350° C., the resulting polymers were crosslinked and insoluble in common organic solvents. Molecular weights prepared include 3000, 6000 and 9000 g/mole. However, this should not be viewed as a limitation since essentially any molecular weight from ≈500 to ≈20000 g/mole is easily prepared by adjusting the monomer stoichiometry. A modified Carothers equation, $D_p=(1+r)/(1-r)$ where r=monomer ratio and $D_p$=degree of polymerization, provides a means to calculate the monomer ratio necessary to produce the desired molecular weight. The general synthetic procedure is shown in the drawing. Data for theoretical number average molecular weights ($M_n$), inherent viscosities ($\eta_{inh}$) and glass transition temperatures of uncured and cured polymers are included in Table 1. Data for the thermal stability of the cured polymer in air and nitrogen and the thin film properties are included in Table 2. Data for the titanium to titanium adhesive properties are included in Table 3. The phenylethynyl-terminated imide oligomers of the present invention are eminently suitable as adhesives, composite matrices, moldings, films and coatings.

Two significant advantages of phenylethynyl-terminated imide oligomers compared to linear polyimides are better compression moldability (more flow, better consolidation under less pressure) and the ability to react forming a structure containing some crosslinks which typically increases the solvent resistance, glass transition temperature, and modulus. These properties are important for aerospace applications as films, moldings, adhesives and composites.

The advantage of phenylethynyl-terminated imide oligomers compared to polyimides containing pendent ethynyl or phenylethynyl groups is that the phenylethynyl-terminated imide oligomers have low to moderate molecular weights and therefore have lower melt viscosity for easier processing into moldings, composites and adhesive bonds.

The advantage of phenylethynyl-terminated imide oligomers compared to ethynyl-terminated polyimides is the higher reaction temperature of the phenylethynyl group compared to the ethynyl group. The phenylethynyl group begins to react at ~350° C. (beginning of the exotherm in the DSC trace when run at 20° C./min) compared to ~200° C. for the ethynyl group. This higher reaction temperature provides a larger window to melt process these oligomers whereas ethynyl-terminated imide oligomers begin to react and, therefore are either not melt processable or have a very small window to melt process.

BRIEF DESCRIPTION OF THE DRAWING

For a more complete understanding of the present invention, including its primary objects and attending benefits reference should be made to the Description of the Preferred Embodiments, which is set forth in detail below. This description should be read together with the accompanying drawing, wherein the single drawing FIGURE is an equation showing the general synthetic scheme for the preparation of phenylethynyl terminated imide oligomers according to the present invention.

DESCRIPTION OF THE PREFERRED EMBODIMENTS

The approach according to the present invention was to provide phenylethynyl-terminated polyimides by employing any of four novel phenylethynyl amine compounds to endcap imide oligomers. By adjusting the monomer stoichiometry, the molecular weight of the resulting phenylethynyl-terminated polyimide could be controlled. The four phenylethynyl amine compounds are 3 and 4-aminophenoxy-4'-phenylethynylbenzophenone, and 3 and 4-amino-4'-phenylethynylbenzophenone, which have the following structures, respectively:

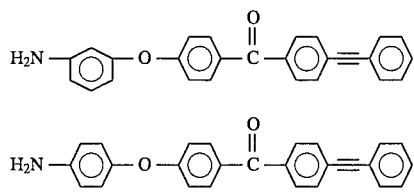

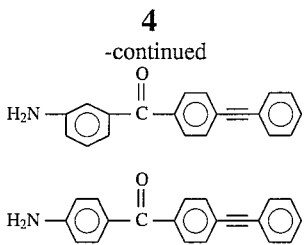

The phenylethynyl group is the functionality which reacts at elevated temperatures, while the amine group allows the compound to be incorporated into any system which reacts with an amine. Any compound having the following general structural formula can also be used as an endcapping agent

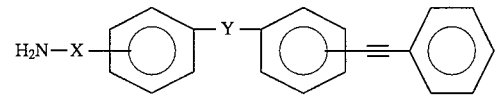

where X is nil or a meta or para substituted phenoxy group and Y is an activating group consisting of $C(CF_3)_2$, CO, or $SO_2$.

The phenylethynyl group has two important advantages over the ethynyl group. These are stability towards conditions of aromatic nucleophilic displacement reactions and stability at moderate temperatures (i.e. 150°–250° C.). For example, when 4-phenylethynyl-4'-fluorobenzophenone was treated with a slight excess of 3 or 4-aminophenol in the presence of an alkali metal base such as potassium carbonate in a polar aprotic solvent such as N,N-dimethylacetamide (DMAc) at 143° C., 3 or 4-aminophenoxy-4'-phenylethynylbenzophenone was afforded in nearly quantitative yield. However, several attempts to make the 3-aminophenoxy-4'-ethynylbenzophenone from the 4-ethynyl-4'-fluorobenzophenone under similar reaction conditions afforded a mixture of products. In addition, imide model compounds of the phenylethynyl endcapper react at a moderate to fast rate in air at 300° to 350° C. whereas analogous model compounds containing the ethynyl group react at a moderate to fast rate in air at 200° to 250° C. Phenylethynyl containing imide model compounds are reasonably stable at 200° C. (see Example 6) whereasthynyl containing imide model compounds react at 200° C.

When an imide oligomer terminated with these activated phenylethynyl endcappers has been cured in a steel mold for 1 hour at 200 psi and 350° C., the resulting glass transition temperatures (Tg) are 15° to 20° C. higher than those of the cured imide oligomer terminated with nonactivated phenylethynyl endcappers. (See Example 7 below and the accompanying Table). Cured imide oligomers terminated with the activated phenylethynyl endcappers offered higher use temperatures than that of cured imide oligomers from nonactivated phenylethynyl endcappers.

EXAMPLE 1

Synthesis of Bromo Benzophenones

Synthesis of 4-bromo-3'-nitrobenzophenone

In a 250 mL flask equipped with a nitrogen inlet, overhead stirring assembly, and reflux condenser were placed 3-nitrobenzoyl chloride (28 g, 0.15 mol), bromobenzene (130 g, 0.83 mol), and aluminum chloride (22 g, 0.16 mol). The mixture was heated for 3 h at 100° C., then cooled to room temperature and stirred for an additional 16 h. The mixture was poured into 1 L of acidic (HCl) ice water, and the organics were extracted using methylene chloride, dried over magnesium sulfate, and the solvents were removed under reduced pressure to yield a yellow powder. Recrystallization from acetone afforded 42.1 g (90% yield) of white crystals: m.p. 104°–105° C.

Anal Calcd for $C_{13}H_8NO_3Br$: %C=51.01 %H=2.63 %N=4.58 %Br=26.01 Found: %C=50.08 %H=2.82 %N=4.45 %Br=25.81

Synthesis of 4-bromo-4'-nitrobenzophenone

In a 250 mL flask equipped with a nitrogen inlet, overhead stirring assembly, and reflux condenser were placed 4-nitrobenzoyl chloride (22.6 g, 0.122 mol), bromobenzene (100 g, 0.63 mol), and aluminum chloride (17.3 g, 0.13 mol). The mixture was heated for 3 h at 100° C., then cooled to room temperature and stirred for an additional 16 h. The mixture was poured into 1 L of acidic (HCl) ice water, and the organics were extracted using methylene chloride, dried over magnesium sulfate, and the solvents were removed under reduced pressure to yield a yellow powder. Recrystallization from acetone afforded 29.2 g (85% yield) of yellow crystals: m.p. 123°–124° C., (Lit. 122° C.).

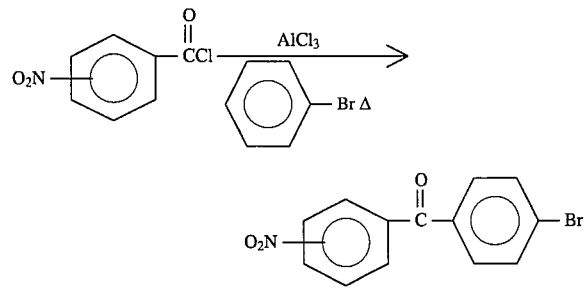

EXAMPLE 2

Synthesis of Phenylethynylbenzophenones

Synthesis of 4-fluoro-4'-phenylethynylbenzophenone

In a 250 mL flask equipped with a nitrogen inlet, overhead stirring assembly, and reflux condenser were placed fluorobenzene (117 g, 1.2 mol) and 4-bromobenzoyl chloride (39.8 g, 0.181 mol). The mixture was cooled to 0° C. and aluminum chloride (27 g, 0.20 mol) was added. The mixture was stirred for 15 minutes at 23° C., followed by heating to reflux for 4 h. The reaction was then cooled to 23° C. and stirred for 16 h. The resulting slurry was poured into 2 L of acidic (HCl) water. The organics were extracted with methylene chloride, and dried over magnesium sulfate. The slurry was filtered and the methylene chloride was removed under reduced pressure to yield an off white powder. Recrystallization from ethanol afforded 43.3 g (86%) of 4-bromo-4'-fluorobenzophenone as white crystals: m.p. 106°–107° C., (Lit. 107°–108° C.).

In a 500 mL flask equipped with nitrogen inlet, overhead stirring assembly, and reflux condenser were placed 4-bromo-4'-fluorobenzophenone (30.0 g, 0.107 mol), phenylacetylene (11.0 g, 0.107 mol), triphenylphosphine (0.2 g), copper (I) iodide (0.1 g), bis(triphenylphosphine)pallidium (II) chloride (0.1 g), and 450 mL of triethylamine. The mixture was heated to reflux for 4 h and then cooled to 23° C. and stirred for an additional 16 h. The mixture was poured into acidic (HCl) water and the precipitate was collected by filtration. Recrystallization from acetone yielded 23 g (75%) of white crystals: m.p. 150°–151° C. IR (KBr): 2211 cm–1 (C≡C); 1650 cm–1 (C=O); 1225 cm–1 (arylfluorine); 1H-NMR (CDCl₃): 7.8–6.8 ppm (m H aromatic).

Anal Calcd for $C_{21}H_{13}FO$: %C=83.99 %H=4.36 %F=6.83 Found: %C=83.98 %H=4.38 %F=6.16

Synthesis of 3-nitro-4'-phenylethynylbenzophenone

In a 250 mL flask equipped with a nitrogen inlet and reflux condenser were placed 4-bromo-3'-nitrobenzophenone (15.31 g, 0.050 mol), phenylacetylene (5.62 g, 0.055 mol), triphenylphosphine (0.100 g), bis(triphenylphosphine)pallidium (II) chloride (0.050 g), and 100 mL of triethylamine. The mixture was heated to 50°–60° C. Copper (I) iodide (0.050 g), and additional 50 mL of triethylamine were added. The reaction was heated to reflux for 2 h, then cooled to room temperature. The resulting precipitate was collected by filtration, washed with acidic (HCl) water, and dried at 100° C. Recrystallization from 1-butanol afforded 13.73 g (85% yield) of white crystals: m.p. 185°–186° C. IR (KBr) 3086 cm–1 (aromatic); 2209 cm–1 (C≡C); 1654, 1612 cm–1 (C=O); and 1601 cm–1 (aromatic C—H).

Anal Calcd for $C_{21}H_{13}NO_3$: %C=77.05 %H=4.00 %N=4.28 Found: %C=76.54 %H=4.26 %N=4.02

Synthesis of 4-nitro-4'-phenylethynylbenzophenone

In a 250 mL flask equipped with a nitrogen inlet and reflux condenser were placed 4-bromo-4'-nitrobenzophenone (19.3 g, 0.063 mol), phenylacetylene (6.5 g, 0.063 mol), triphenylphosphine (0.15 g), bis(triphenylphosphine)pallidium (II) chloride (0.08 g), copper (I) iodide (0.08 g), and 100 mL of triethylamine. The mixture was heated to 65° C. for 16 h, then cooled to room temperature. The resulting mixture was poured into acidic (HCl) water, the precipitate was collected by filtration and dried in vacuo at 110° C. Recrystallization from toluene afforded 9.5 g (47% yield) of yellow-white crystals: m.p. 193°–195° C. IR (KBr) 3086 cm–1 (aromatic); 2212 cm–1 (C≡C); 1656 cm–1(C=O); and 1602 cm–1 (aromatic C—H). Mass Spec. m/e (relative intensity): M+, 327.1 (53%); FW=327.34 g/mol.

Anal Calcd for $C_{21}H_{13}NO_3$: %C=77.05 %H=4.00 %N=4.28 Found: %C=76.84 %H=3.94 %N=3.81.

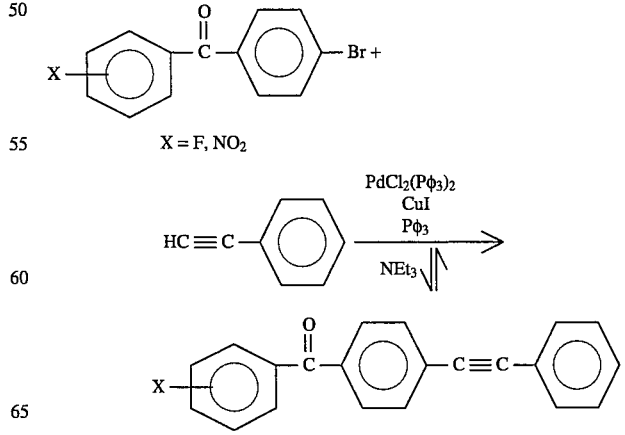

EXAMPLE 3

Synthesis of Phenylethynylamino Endcappers

Synthesis of
4-(3-aminophenoxy)-4'-phenylethynylbenzophenone
(3-APEB)

In a 500 mL flask equipped with nitrogen inlet, overhead stirring assembly, Dean-Stark trap, and reflux condenser were placed 3-aminophenol (18.5 g, 0.17 mol), 4-phenylethynyl-4'-fluorobenzophenone (43.2 g, 0.14 mol), potassium carbonate (22 g, 0.16 mol), toluene (30 mL), and DMAc (200 mL). The mixture was heated to 142° C. for 8 h, then cooled to room temperature. The reaction mixture was poured into water and the resulting light yellow powder was collected by filtration. Recrystallization from water/acetone (50/50) (v) and sodium dithionite (0.5 g) afforded 51.8 g (95% yield) of the desired product: m.p. 137°–139° C. IR (KBr); 3414 and 3342 cm–1 ($NH_2$); 3040, 1596, and 1499 cm–1 (aromatic C—H); 2216 cm–1 (C≡C), and 1646 cm–1 (C=O): Mass Spec. m/e (relative intensity): M+, 389.4 (100); FW=389.44 g/mol.

Anal Calcd for $C_{27}H_{19}NO_2$: %C=83.28 %H=4.92 %N=3.60 Found: %C=82.80 %H=4.86 %N=3.00

4-(4-Aminophenoxy)-4'-phenylethynylbenzophenone
(4-APEB)

In a 250 mL flask equipped with nitrogen inlet, overhead stirring assembly, Dean-Stark trap, and reflux condenser were placed 4-aminophenol (5.46 g, 0.05 mol), 4-phenylethynyl-4'-fluorobenzophenone (15.02 g, 0.05 mol), potassium carbonate (7.6 g, 0.055 mol), toluene (20 mL), and DMAc (45 mL). The mixture was heated to 150° C. for 2 h, then cooled to room temperature. The reaction mixture was poured into water and the resulting light yellow powder was collected by filtration. Recrystallization from toluene afforded the desired product in 85% yield: m.p. 151°–153° C. IR (KBr); 3382 and 3314 cm–1 ($NH_2$); 3049, 1599, and 1509 cm–1 (aromatic C—H); 2217 cm–1 (C≡C); and 1645 cm–1 (C=O): Mass Spec. m/e (relative intensity): M+, 389.4 (100); FW=389.44 g/mol.

Anal Calcd for $C_{27}H_{19}NO_2$: %C=83.28 %H=4.92 %N=3.60 Found: %C=81.50 %H=4.98 %N=3.39

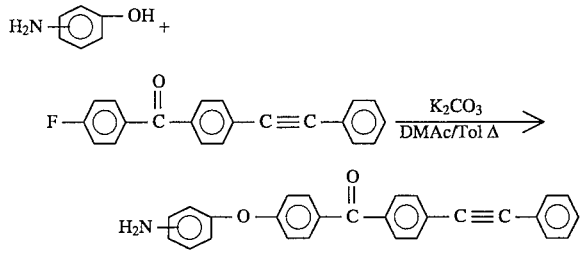

Synthesis of
3-amino-4'-phenylethynylbenzophenone

In a 500 mL flask equipped with a nitrogen inlet, thermometer, addition funnel, and reflux condenser were placed 3-nitro-4'-phenylethynylbenzophenone (8.18 g, 0.0250 mol), ammonium chloride (5.35 g, 0.10 mol) and ethanol (60 mL). A solution of sodium sulfide nonahydrate (24.02 g, 0.10 mol) and water (60 mL) was added over a 45 minute period. The mixture was heated to 70° C. for 4 h. Water (120 mL) was added and the mixture was allowed to cool to room temperature. The precipitated solid was collected by filtration, washed in water and allowed to dry. Recrystallization from ethanol afforded 5.09 g (69% yield) of a pale yellow solid: m.p. 140°–142° C. IR (KBr); 3463 3356 and 3208 cm–1 ($NH_2$); 2217 cm–1 (C≡C); and 1646 cm–1 (C=O): 1H-NMR (CDCl$_3$): 3.63 (s, 2H amine); 6.7–8.0 (m, 13H, aromatic). Mass Spec. m/e (relative intensity): M+, 297 (74); FW=297.36 g/mol.

Anal Calcd for $C_{21}H_{15}NO$: %C=84.82 %H=5.08 %N=4.71 Found: %C=84.99 %H=5.12 %N=4.52

Synthesis of
4-amino-4'-phenylethynylbenzophenone

In a 500 mL flask equipped with a nitrogen inlet and reflux condenser were placed sodium sulfide nonahydrate (16.81 g, 0.070 mol), 4-nitro-4'-phenylethynylbenzophenone (9.82 g, 0.030 mol), ammonium chloride (3.74 g, 0.070 mol), 200 mL of ethanol, and 20 mL of water. The mixture was heated to reflux for 4 h, then allowed to cool to room temperature. The solvent was removed under reduced pressure, and the resulting solid was washed in water, collected by filtration, and dried at 100° C. Recrystallization from ethanol afforded 5.41 g (61% yield) of a pale yellow solid: m.p. 195°–196.5° C. IR (KBr) 3422, 3340, and 3224 cm–1 ($NH_2$); 2216 cm–1 (C≡C); 1637 cm–1 (C=O). 1H-NMR (DMF-d$_7$): 6.28 (s, 2H amine); 6.65–7.90 (m, 13H, aromatic). Mass Spec. m/e (relative intensity): M+, 297.2 (47); FW=297.36 g/mol.

Anal Calcd for $C_{21}H_{15}NO$: %C=84.82 %H=5.08 %N=4.71 Found: %C=84.60 %H=5.26 %N=4.60

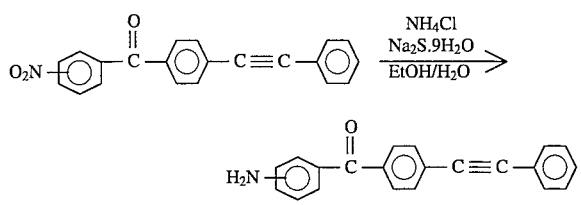

EXAMPLE 4

Synthesis of Imide Model Compounds

Synthesis of
4-phenylethynylbenzoyl-4'-phenoxy-3"-phenylphthalimide

In a 200 mL flask equipped with a reflux condenser were placed phthalic anhydride (1.33 g, 8.9 mmol), 3-APEB (3.50 g, 8.9 mmol), and acetic acid (100 mL). The solution was stirred for 1.5 h at 23° C. and heated to reflux for 3 h. The solution was poured into 2 L of water, the precipitate was collected by filtration, washed in warm ethanol, and dried at 120° C. in vacuo to afford 4.4 g (95% yield) of white powder: m.p. 167.5°–169° C. IR (KBr); 3040–3010 and 1602 cm–1 (aromatic C—H), 2209 cm–1 (C≡C), 1771 and 1727 cm–1 (imide), and 1657 cm–1 (C=O).

Anal Calcd for $C_{35}H_{21}NO_4$: %C=80.91 %H=4.07 %N=2.70 Found: %C=79.72 %H=3.99 %N=2.57

Synthesis of
4-phenylethynylbenzoyl-4'-phenoxy-4"-phenylphthalimide

In a 50 mL flask equipped with a reflux condenser were placed phthalic anhydride (0.76 g, 5.13 mmol), 4-APEB (2.00 g, 5.13 mmol), and acetic acid (30 mL). The solution was heated to reflux for 16 h. The solution was poured into 1 L of water, and the precipitate was collected by filtration, washed in boiling methanol, and dried at 100° C. in vacuo to afford 2.5 g (95% yield) of light tan powder: visual m.p. 202°–205° C. IR (KBr); 3050–3020 and 1600 cm−1 (aromatic C—H), 2217 cm−1 (C≡C), 1772 and 1714 cm−1 (imide), and 1648 cm−1 (C=O).

Anal Calcd for $C_{35}H_{21}NO_4$: %C=80.91 %H=4.07 %N=2.70 Found: %C=78.88 %H=4.06 %N=2.31

Synthesis of 4-phenylethynylbenzoyl-4'-phenylphthalimide

In a 100 mL flask equipped with a reflux condenser were placed 4-amino-4'-phenylethynylbenzophenone (2.97 g, 0.010 mol), phthalic anhydride (1.48 g, 0.010 mol), and 50 mL of glacial acetic acid. The mixture was heated to reflux for 16 h, then cooled to room temperature. The resulting solid was collected by filtration and dried at 100° C. Recrystallization from 1-butanol afforded 3.05 g (71.4% yield) of

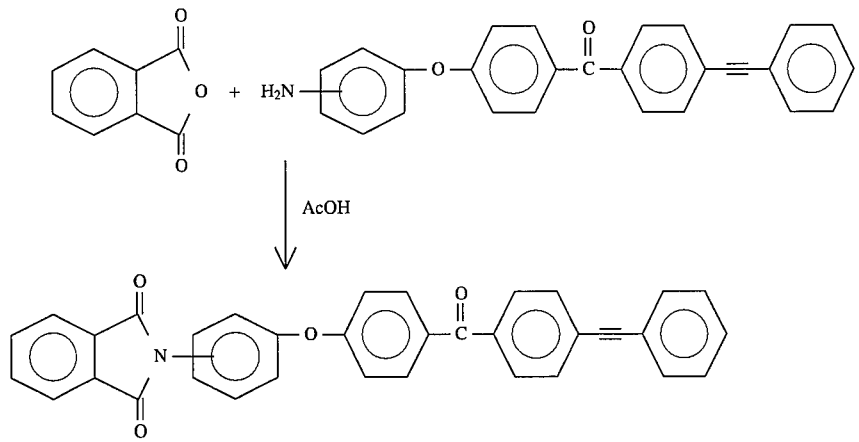

Synthesis of 4-phenylethynylbenzoyl-3'-phenylphthalimide

In a 100 mL flask equipped with a reflux condenser were placed 3-amino-4'-phenylethynylbenzophenone (2.97 g, 0.010 mol), phthalic anhydride (1.48 g, 0.010 mol), and glacial acetic acid (50 mL). The mixture was heated to reflux for 16 h, then cooled to room temperature. The resulting precipitate was collected by filtration, washed with acetic acid and water and dried at 100° C. Recrystallization from 1-butanol afforded 3.50 g (82% yield) of a white solid: m.p. 195°–195.5° C. IR (KBr) 2214 cm−1 (C≡C), 1727 cm−1 (imide C=O), and 1654 cm−1 (C=O). Mass Spec. m/e (relative intensity): M+, 427.4 (6); FW=427.46 g/mol.

Anal Calcd for $C_{29}H_{17}NO_3$: %C=81.49 %H=4.01 %N=3.28 Found: %C=81.38 %H=3.93 %N=3.10 white crystals: m.p. 204°–205° C. IR (KBr) 2216 cm−1 (C≡C), 1774, 1718 cm$^{-1}$ (imide C=O), and 1654 cm−1 (C=O). Mass Spec. m/e (relative intensity): M+, 427.4 (6); FW=427.46 g/mol.

Anal Calcd for $C_{29}H_{17}NO_3$: %C=81.49 %H=4.01 %N=3.28 Found: %C=81.12 %H=3.82 %N=2.89

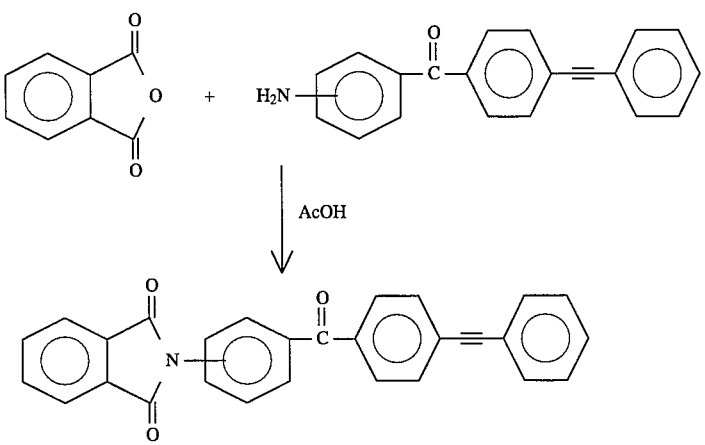

EXAMPLE 5

4-Phenylethynylbenzoyl-4'-phenoxy-3''-phenylphthalimide, 4-phenylethynylbenzoyl-4'-phenoxy-4''-phenylphthalimide, and 4-phenylethynylbenzoyl-4'-phenylphthalimide were individually placed in a DSC cell and heated at a rate of 10° C./min to 450° C. The model compounds displayed melting point maxima of 172°, 209° and 208° C. with a melting enthalpies of 101, 109, and 107 J/g respectively. The exothermic onsets occurred at 354°, 347°, and 319° C. with maximum onsets at 415°, 402°, and 399° C. and curing enthalpies of 248, 287, and 408 J/g respectively. These compounds were also held at 350° C. for 1 h. The resulting DSC thermograms of these thermally treated compounds displayed an absence of both melting points and exothermic peaks.

EXAMPLE 6

4-Phenylethynylbenzoyl-4'-phenoxy-3"-phenylphthalimide, 4-phenylethynyl-benzoyl-4'-phenoxy-4"-phenylphthalimide, and 4-phenylethynylbenzoyl-4'-phenylphthalimide were individually placed in a DSC cell and held at 200° C. for 20 h. The melting enthalpies of these compounds were 90.7, 73.2, and 95.7 J/g respectively indicating that 89%, 68%, and 89% of the starting material remained intact.

EXAMPLE 7

Synthesis of a 9000 g/mol phenylethynyl-terminated imide oligomer

In a 250 mL flask equipped with a nitrogen inlet, overhead stirring assembly, and reflux condenser were placed 3,4'-ODA (3.7992 g,).019 mol), ODPA (6.2045 g, 0.200 mol), and the appropriate endcapper (0.8007 mol), m-cresol (54 g), and isoquinoline (0.2 g). The solution was stirred at 23° C. for 16 h, and heated to reflux for 3.5 h. The reaction was cooled to 23° C. and poured into stirring methanol. The white precipitate was collected by filtration, extracted with methanol for 48 h and dried in vacuo at 180° C. for 10 h to yield 9.2 g (98%) of white powder.

Thermal Properties of a 9000 g/mol Imide Oligomer Synthesized from ODPA and 3,4'-ODA Using Several Phenylethynyl Endcaps (NMP), N, N-dimethylformamide (DMF) or m-cresol. Ar' can be as simple as 1,2,4,5-tetrasubstituted benzene, or it may be a bis-4-(o-diphenylene) having the general structure

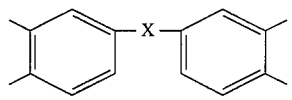

where X=nil, O, S, C=O, $SO_2$, $CH_2$, $C(CH_3)_2$, $C(CF_3)_2$,

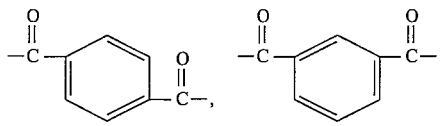

etc., and mixtures thereof.

Ar in the Drawing is selected from a group of radicals consisting of

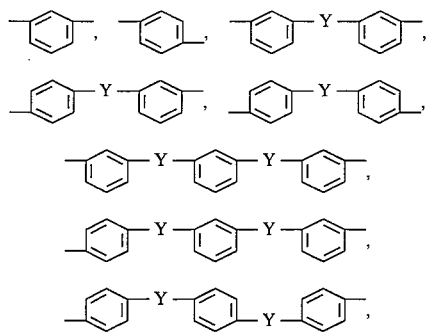

| Endcap | $\eta_{inh}$ (dL/g)[a] | Tg (°C.) Uncured | Tg (°C.) Cured[b] |
|---|---|---|---|
| H₂N—⌬—O—⌬—C(=O)—⌬—≡—⌬ | 0.35 | 218 | 243 |
| H₂N—⌬—C(=O)—⌬—≡—⌬ | 0.41 | 226 | 242 |
| H₂N—⌬—≡—⌬ | 0.36 | 220 | 228 |
| H₂N—⌬—O—⌬—≡—⌬ | 0.37 | 213 | 223 |

[a]Measured in m-cresol at 25° C. using a conc. of 0.5 g/dL.
[b]Cured in a mold at 350° C. for 1 hour at 200 psi.

The general reaction scheme for the phenylethynyl-terminated imide oligomers is shown in the Drawing where n is an integer from 1–100 repeat units. The solvent can be N, N-dimethylacetamide (DMAc), N-methylpyrrolidinone -continued

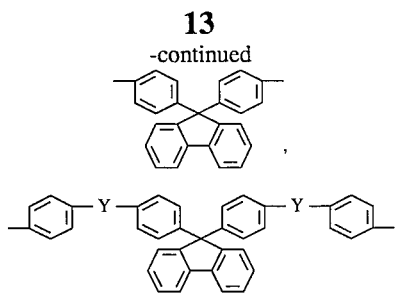

wherein Y=nil, O, S, C=O, $SO_2$, $CH_2$, $C(CH_3)_2$, $C(CF_3)_2$, etc., and mixtures thereof.

Phenylethynyl-terminated imide oligomers with a wide range of molecular weights (≈500 to ≈20,000 g/mole) are readily prepared by offsetting the ratio of one monomer relative to the other by a calculated amount and adding an appropriate amount of either 3- or 4-aminophenoxy-4'-phenylethynylbenzophenone or 3- or 4-amino-4'-phenylethynylbenzophenone. Prior to curing, low molecular weight polymers have low melt viscosity and are readily processed into moldings, composites and adhesive bonds. When cured, different molecular weight polymers display different properties. For example, low molecular weight phenylethynyl-terminated imide oligomers provide a higher crosslink density than higher molecular weight phenylethynyl-terminated imide oligomers. Materials containing high crosslink density normally produce better solvent resistance, higher modulus, better high temperature properties and lower toughness than those containing low crosslink density. Therefore, the polymers can be designed with the proper combination of properties for the desired application by controlling the molecular weight. Specific examples follow.

EXAMPLE 8

The following example illustrates the synthesis of a phenylethynyl-terminated imide oligomer with theoretical number average molecular weight of 3000 g/mole. 3,4'-Oxydianiline (ODA) (4.268 mmole, 0.8546 g), 4,4'-oxydiphthalic dianhydride (ODPA) (5.000 mmole, 1.5511 g), 4-(4-aminophenoxy)-4'-phenylethynylbenzophenone (4-APEB) (1.494 mmole, 0.5819 g, 2% excess), m-cresol (14 g), and isoquinoline (0.2 g) were added to a 100 mL three neck flask equipped with a mechanical stirrer, condenser and nitrogen inlet. The reaction was stirred at 25° C. for 16 h followed by heating at reflux (≈195° C.) for 4 h. After cooling, the reaction was poured into methanol, washed in boiling methanol and dried at 110° C. for 72 h to afford an off-white solid in >95% yield. The ($\eta_{inh}$) resulting phenylethynyl-terminated polyimide had an inherent viscosity of 0.20 dL/g in m-cresol at 25° C. Additional properties for this polymer are listed in Tables 1, 2 and 3.

TABLE 1

CHARACTERIZATION OF 3,4'-ODA/ODPA PHENYLETHYNYL-TERMINATED IMIDE OLIGOMERS AND THEIR CURED POLYMERS

| Theoretical Mn, g/mole | Endcapper | Polyimide $\eta$inh, dL/g | DSC Tg, °C. Initial[a] | Final[b] |
|---|---|---|---|---|
| 3000 | 3-APEB | 0.12 | 173 | 233 |
| 3000 | 4-APEB | 0.20 | 195 | 246 |
| 6000 | 3-APEB | 0.22 | 208 | 246 |
| 6000 | 4-APEB | 0.22 | 208 | 245 |
| 9000 | 3-APEB | 0.36 | 220 | 249 |
| 9000 | 4-APEB | 0.41 | 222 | 250 |

[a]Thermally imidized in m-cresol at ~195° C. for 4 h with isoquinoline catalyst
[b]After curing 1 h each at 100, 225 and 350° C.

TABLE 2

THERMAL STABILITY AND RT THIN FILM PROPERTIES OF CURED 3,4'-ODA/OPDPA PHENYLETHYNYL-TERMINATED IMIDE OLIGOMERS

| Theoretical Mn, g/mole | Endcapper | Temperature at 5% Weight Loss[a], °C. Air | $N_2$ | Tensile Strength, ksi | Tensile Modulus, ksi | Elongation, % |
|---|---|---|---|---|---|---|
| 3000 | 3-APEB | 443 | 498 | —[b] | — | — |
| 3000 | 4-APEB | 493 | 497 | —[b] | — | — |
| 6000 | 3-APEB | 439 | 468 | —[b] | — | — |
| 6000 | 4-APEB | 486 | 493 | —[b] | — | — |
| 9000 | 3-APEB | 433 | 465 | 19.6 | 558 | 6.5 |
| 9000 | 4-APEB | 473 | 502 | 19.3 | 455 | 8.8 |

[a]Heating rate of 2.5° C./min in flowing air or nitrogen.
[b]Did not form a tough film.

TABLE 3

FABRICATION CONDITIONS AND ADHESIVE PROPERTIES OF CURED 3-APEB TERMINATED 3,4'-ODA/ODPA IMIDE OLIGOMERS

| Theoretical Mn, g/mole | Molding Pressure, psi | Exposure Conditions | Test Temperature, °C. | Shear Strength, psi |
|---|---|---|---|---|
| 3000 | 15 | none | 23 | 4730 |
| 3000 | 25 | none | 23 | 5270 |
| 3000 | 50 | none | 23 | 5270 |

TABLE 3-continued

FABRICATION CONDITIONS AND
ADHESIVE PROPERTIES OF CURED 3-APEB
TERMINATED 3,4'-ODA/ODPA IMIDE OLIGOMERS

| Theoretical Mn, g/mole | Molding Pressure, psi | Exposure Conditions | Test Temperature, °C. | Shear Strength, psi |
|---|---|---|---|---|
| 3000 | 50 | 48 h soak[a] | 23 | 5410 |
| 3000 | 50 | none | 177 | 3860 |
| 9000 | 15 | none | 23 | 4930 |
| 9000 | 25 | none | 23 | 5460 |
| 9000 | 50 | none | 23 | 7400 |
| 9000 | 50 | 48 h soak[a] | 23 | 6370 |
| 9000 | 50 | none | 177 | 3900 |
| 9000 | 50 | 3000 h/177° C. | 177 | 3890 |

[a]Chevron HyJet IV hydraulic fluid.

EXAMPLE 9

The following example illustrates the synthesis of a phenylethynyl-terminated imide oligomer with theoretical number average molecular weight of 6000 g/mole. 3,4'-Oxydianiline (ODA) (4.619 mmole, 0.9250 g), 4,4'-oxydiphthalic dianhydride (ODPA) (5.000 mmole, 1.5511 g), 4-(4-aminophenoxy)-4'-phenylethynylbenzophenone (4-APEB) (0.7762 mmole, 0.3023 g, 2% excess), m-cresol (14 g), and isoquinoline (0.2 g) were added to a 100 mL three neck flask equipped with a mechanical stirrer, condenser and nitrogen inlet. The reaction was stirred at 25° C. for 16 h by heating at reflux ($\approx$195° C.) for 4 h. After cooling, the reaction was poured into methanol, washed in boiling methanol and dried at 110° C. for 72 h to afford an off-white solid in >95% yield. The resulting phenylethynyl-terminated polyimide had an inherent viscosity ($\eta_{inh}$) of 0.22 dL/g in m-cresol at 25° C. Additional properties for this polymer are listed in Tables 1, 2 and 3.

EXAMPLE 10

The following example illustrates the synthesis of a phenylethynyl-terminated imide oligomer with theoretical number average molecular weight of 9000 g/mole. 3,4'-Oxydianiline (ODA) (4.743 mmole, 0.9498 g), 4,4'-oxydiphthalic dianhydride (ODPA) (5.000 mmole, 1.5511 g), 4-(4-aminophenoxy)-4'-phenylethynylbenzophenone (4-APEB) (0.5243 mmole, 0.2042 g, 2% excess), m-cresol (14 g), and isoquinoline (0.2 g) were added to a 100 mL three neck flask equipped with a mechanical stirrer, condenser and nitrogen inlet. The reaction was stirred at 25° C. for 16 h followed by heating at reflux ($\approx$195° C.) for 4 h. After cooling, the reaction was poured into methanol, washed in boiling methanol and dried at 110° C. for 72 h to afford an off-white solid in >95% yield. The resulting phenylethynyl-terminated polyimide had $\eta_{inh}$ of 0.41 dL/g in m-cresol at 25° C. A film cast from m-cresol solution of this oligomer and cured 1 h at 350° C. was tough and finger nail creasible. The film was completely insoluble and did not swell when soaked for 48 h in DMAc and completely insoluble but swelled slightly ($\approx$5% increase in area) when soaked for 48 h in methylene chloride. Additional properties for this polymer are listed in Tables 1, 2 and 3.

EXAMPLE 11

The following example illustrates the synthesis of a phenylethynyl-terminated imide oligomer with theoretical number average molecular weight of 3000 g/mole. 3,4'-Oxydianiline (ODA) (17.07 mmole, 3.4178 g), 4,4'-oxydiphthalic dianhydride (ODPA) (20.00 mmole, 6.2045 g), 4-(3-aminophenoxy)-4'-phenylethynylbenzophenone (3-APEB) (5.864 mmole, 2.2837 g), m-cresol (55 g), and isoquinoline (0.2 g) were added to a 100 mL three neck flask equipped with a mechanical stirrer, condenser and nitrogen inlet. The reaction was stirred at 25° C. for 16 h followed by heating at reflux ($\approx$195° C.) for 4 h. After cooling, the reaction was poured into methanol, washed in boiling methanol and dried at 110° C. for 72 h to afford an off-white solid in >95% yield. The resulting phenylethynyl-terminated polyimide had $\eta_{inh}$ of 0.12 dL/g in m-cresol at 25° C. Additional properties for this polymer are listed in Tables 1, 2 and 3.

EXAMPLE 12

The following example illustrates the synthesis of a phenylethynyl-terminated imide oligomer with theoretical number average molecular weight of 6000 g/mole. 3,4'-Oxydianiline (ODA) (18.48 mmole, 3.7001 g), 4,4'-oxydiphthalic dianhydride (ODPA) (20.00 mmole, 6.2045 g), 4-(3-aminophenoxy)-4'-phenylethynylbenzophenone (3-APEB) (3.044 mmole, 1.1855 g), m-cresol (55 g), and isoquinoline (0.2 g) were added to a 100 mL three neck flask equipped with a mechanical stirrer, condenser and nitrogen inlet. The reaction was stirred at 25° C. for 16 h followed by heating at reflux ($\approx$195° C.) for 4 h. After cooling, the reaction was poured into methanol, washed in boiling methanol and dried at 110° C. for 72 h to afford an off-white solid in >95% yield. The resulting phenylethynyl-terminated polyimide had $\eta_{inh}$ of 0.22 dL/g in m-cresol at 25° C. Additional properties for this polymer are listed in Tables 1, 2 and 3.

EXAMPLE 13

The following example illustrates the synthesis of a phenylethynyl-terminated imide oligomer with theoretical number average molecular weight of 9000 g/mole. 3,4'-Oxydianiline (ODA) (18.97 mmole, 3.7992 g), 4,4'-oxydiphthalic dianhydride (ODPA) (20.00 mmole, 6.2045 g), 4-(3-aminophenoxy)-4'-phenylethynylbenzophenone (3-APEB) (2.056 mmole, 0.8007 g), m-cresol (55 g), and isoquinoline (0.2 g) were added to a 100 mL three neck flask equipped with a mechanical stirrer, condenser and nitrogen inlet. The reaction was stirred at 25° C. for 16 h followed by heating at reflux ($^{-}$195° C.) for 4 h. After cooling, the reaction was poured into methanol, washed in boiling methanol and dried at 110° C. for 72 h to afford an off-white solid in >95% yield. The resulting phenylethynyl-terminated polyimide had $\eta_{inh}$ of 0.36 dL/g in m-cresol at 25° C. A film cast from m-cresol solution of this oligomer and cured 1 h at 350° C. was tough and finger nail creasible. The film was completely insoluble and did not swell when soaked for 48 h in DMAc and completely insoluble but swelled slightly ($\approx$5% increase in area) when soaked for 48 h in methylene chloride. Additional properties for this polymer are listed in Tables 1, 2 and 3. This material has been designated LARC™-PETI-1.

EXAMPLE 14

The following example illustrates the synthesis of a phenylethynyl-terminated imide oligomer with theoretical number average molecular weight of 9000 g/mole. 3,4'-Oxydianiline (ODA) (50.00 mmole, 10.0123 g), 3,3',4,4'-benzophenone tetracarboxylic dianhydride (BTDA) (47.37 mmole, 15.2642 g), 4-(3-aminophenoxy)-4'-phenylethynylbenzophenone (3-APEB) (5.260 mmole, 2.0485 g), m-cresol (155 g), and isoquinoline (2 g) were added to a 250 mL three neck flask equipped with a mechanical stirrer, condenser and nitrogen inlet. The reaction was stirred at 25° C. for 16 h followed by heating at reflux (~195° C.) for 4 h to form an insoluble yellow precipitate. After cooling, the reaction was poured into methanol, washed in boiling methanol and dried at 110° C. for 72 h to afford a light yellow solid in >95% yield. The resulting phenylethynyl-terminated polyimide was insoluble in m-cresol. The initial Tg by DSC was 205° C. and the oligomer displayed a melting point (Tm) with a maximum at 384° C. The wide angle X-ray diffraction pattern also indicated the oligomer was crystalline. The material displayed a final Tg of 278° C. and no Tm after heating to 450° C. and cooling directly to room temperature.

EXAMPLE 15

The following example illustrates the synthesis of a phenylethynyl-terminated imide oligomer with theoretical number average molecular weight of 9000 g/mole. Meta-phenylenediamine (m-PDA) (34.70 mmole, 3.6845 g), isophthaloyldiphthalic anhydride (IDPA) (36.70 mmole, 15.6449 g), 4-(3-aminophenoxy)-4'-phenylethynylbenzophenone (3-APEB) (4.00 mmole, 1.5578 g), N-methylpyrrolidinone (NMP) (140 g) were added to a 250 mL three neck flask equipped with a mechanical stirrer, condenser and nitrogen inlet. The reaction was stirred at 25° C. for 16 h to form the phenylethynyl-terminated polyamide acid followed by adding acetic acid (14 g) and heating at reflux (~130° C.) for 5 h. After cooling, the reaction was poured into water, washed in boiling methanol and dried at 110° C. for 72 h to afford a white solid in >95% yield. The resulting phenylethynyl-terminated polyimide was insoluble in NMP. The initial Tg by DSC was 245° C. and a final Tg of 263° C. was measured after 1 h at 350° C.

EXAMPLE 16

The following example illustrates the synthesis of a phenylethynyl-terminated imide oligomer with theoretical number average molecular weight of 6000 g/mole. 3,4'-Oxydianiline (ODA) (24.974 mmole, 5.0010 g), 1,3-bis(3-aminophenoxy)benzene (APB) (2.7749 mmole, 0.8112 g), 3,3',4,4'-biphenyl tetracarboxylic dianhydride (BPDA) (30.00 mmole, 8.8267 g), 4-(3-aminophenoxy)-4'-phenylethynylbenzophenone (3-APEB) (4.5012 mmole, 1.7529 g), N-methylpyrrolidinone (NMP) (65 g) were added to a 250 mL three neck flask equipped with a mechanical stirrer, condenser and nitrogen inlet. The reaction was stirred at 25° C. for 16 h to form the phenylethynyl-terminated polyamide acid followed by adding toluene (40 mL) and heating at 160° C. for 24 h. After cooling, the reaction was poured into water, washed in boiling methanol and dried at 110° C. for 72 h to afford a yellow solid in >95% yield. The resulting phenylethynyl-terminated polyimide was insoluble in NMP. The initial Tg by DSC was 230° C. and a final Tg of 252° C. was measured after 1 h at 350° C.

EXAMPLE 17

The following example illustrates the synthesis of a phenylethynyl-terminated imide cooligomer with theoretical number average molecular weight of 9000 g/mole. 3,4'-Oxydianiline (ODA) (77.29 mmole, 15.478 g), 4,4'-oxydiphthalic dianhydride (ODPA) (36.70 mmole, 11.384 g), 3,3',4,4'-biphenyl tetracarboxylic dianhydride (BPDA) (36.70 mmole, 10.797 g), 4-(3-aminophenoxy)-4'-phenylethynylbenzophenone (3-APEB) (7.81 mmole, 3.041 g), N-methylpyrrolidinone (NMP) (95 g) were added to a 250 mL three neck flask equipped with a mechanical stirrer, condenser and nitrogen inlet. The reaction was stirred at 25° C. for 16 h to form the phenylethynyl-terminated polyamide acid followed by adding toluene (20 g) and heating at 165° C. for 8 h. After cooling, the reaction was poured into water, washed in boiling methanol and dried at 180° C. for 10 h to afford a yellow solid in >95% yield. The resulting phenylethynyl-terminated imide oligomer had $\eta_{inh}$=0.25 dL/g in NMP at 25° C. The initial Tg by DSC was 227° C. and a final Tg of 258° C. was measured after 1 h at 350° C.

EXAMPLE 18

The following example illustrates the synthesis of a phenylethynyl-terminated imide oligomer with theoretical number average molecular weight of 9000 g/mole. 3,4'-Oxydianiline (ODA) (28.46 mmole, 5.6988 g), 4,4'-oxydiphthalic dianhydride (ODPA) (30.00 mmole, 9.3066 g), 4-amino-4'-phenylethynylbenzophenone (3.08 mmole, 0.9159 g), m-cresol (81 mL) and isoquinoline (5 drops) were added to a 250 mL three neck flask equipped with a mechanical stirrer, condenser and nitrogen inlet. The reaction was stirred at 25° C. for 16 h followed by heating at reflux (~205° C.) for 4 h. A film was cast from a portion of this solution and cured 1 h at 350° C. in air. The rest of the solution was filtered and poured into methanol to precipitate the imide oligomer, which was washed in boiling methanol and dried at 200° C. under vacuum to afford an off-white solid in >95% yield. The resulting phenylethynyl-terminated imide oligomer had $\eta_{inh}$=0.41 dL/g in m-cresol at 25° C. The initial Tg by DSC was 226° C. and a final Tg of 235° C. was measured after 1 h at 350° C. This powder could be compression molded at 350° C. under 200 psi to give a well consolidated, void free molding which was tough and solvent resistant. The air cured film was tough and creasible, with a Tg of 245° C. The film was not noticeably affected by immersion for 48 h in either methylene chloride or DMAc. At 25° C., the tensile strength, tensile modulus and elongation at break were 18,500 psi, 424,500 psi and 53%, respectively. At 177° C., these properties were 8,600 psi, 279,500 psi and 65%, respectively.

EXAMPLE 19

The following example illustrates the synthesis of a phenylethynyl-terminated imide oligomer with theoretical number average molecular weight of 9000 g/mole. This material has the same chemical composition as that is in Example 13 and is designated LARC™-PET-1. 3,4'-Oxydianiline (ODA) (42.69 mmole, 8.5432 g), 4,4'-oxydiphthalic dianhydride (ODPA) (45.00 mmole, 13.9599 g), 3-amino-4'-phenylethynylbenzophenone (4.620 mmole, 1.3738 g) and N-methylpyrrolidinone (NMP) (54 mL) were added to a 250 mL three neck flask equipped with a mechanical stirrer, condenser and nitrogen inlet. The reaction was stirred at 25° C. for 24 h. A film was cast from a portion of this solution and cured 1 h at 350° C. in air. Toluene (50 mL) was added to the rest of the solution and water was removed by azeotropic distillation using a Dean-Stark trap. Toluene was removed and the mixture diluted to a concentration of 15% (w/w) by the addition NMP (61 mL). The mixture was heated at 183°–191 ° C. for 2 h. The precipitated imide oligomer/NMP mixture was poured into methanol, collected by filtration, extracted with methanol for 48 h and dried under vacuum at 220° C. to afford an off-white solid in >98% yield. The resulting phenylethynyl-terminated imide oligomer had $\eta_{inh}$=0.32 dL/g in m-cresol at 25° C. The initial Tg by DSC was 225° C. and a final Tg of 233° C. was measured after 1 h at 350° C.

EXAMPLE 20

Unoriented thin films were prepared in the following manner. NMP solutions (≈30% solids) of the phenylethynyl terminated amide acid oligomers were centrifuged, the decantate doctored onto clean, dry plate glass and dried to a tack free form in a low humidity chamber. The films on glass were dried in flowing air at 100°, 225° and 350° C. for 1 h each. Thin film tensile properties were determined according to ASTM D882. LARC™-M-PETI-1 films gave tensile strength, tensile modulus and elongation at break at 25° C. of 17,600 psi, 425,000 psi and 42% and at 177° C. of 7400 psi, 284,000 psi and 76%, respectively. The air cured film had a Tg of 249° C. Solvent resistance was determined on stressed (0.2×2 in×0.002 in) film strips immersed in various solvents for 2 weeks at ambient temperature. The specimens were secured in a circular form by multiple wraps around a standard paper clip. Films from LARC™-PETI-1 exhibited excellent resistance to ethylene gylcol, methylethyl ketone, jet fuel, hydraulic fluid and toluene.

EXAMPLE 21

Molded specimens were prepared in the following manner. Powdered imide oligomers (approximately 8.5 g) were compression molded in a $1.25^2$ stainless steel mold by heating to a temperature of 350° C. under 150–200 psi and holding for approximately 1 h. Miniature compact tension specimens (0.62 in×0.62 in×0.375 in thick) were machined from the moldings and subsequently tested to determine their fracture toughness ($K_{Ic}$, critical stress intensity factor) according to ASTM E399 usimg four specimens per test condition. Fracture energy ($G_{Ic}$, critical strain energy release rate) was calculated using the mathematical relationship, $G_{Ic}=(K_{Ic})^2/E$, where E is the tensile modulus of the material. LARC™-PETI-1 moldings gave $G_{Ic}$ at 25° C. of 13.8 in lb/in². Other moldings (3 in×3 in×0.020 in) prepared in a stainless steel mold by heating the phenylethynyl terminated imide oligomers to 350° C. under approximately 200 psi for 1 h were machined into dumbell specimens and tensile properties determined according to ASTM D882. Tensile strength and tensile modulus at 25° C. were 15,900 psi and 560,000 psi and at 150° C. were 8,000 psi and 460,000, respectively.

EXAMPLE 22

LARC™-PETI-1 adhesive specimens were prepared in the following manner. Adhesive tape was prepared by coating 112 E-glass (A1100 finish) cloth with phenylethynyl terminated amic acid (PETAA) solution in NMP and drying at a final temperature of 250° C. to a volatile content of approximately 0.7%. Several coats were required to obtain adequate tape thickness. Titanium (Ti-6AI-4V) with a Pasagel 107™ surface treatment was primed with the corresponding PETAA/NMP solution, and dried at 100° and 225° C. for 1 h each. Titanium (Ti-3AI-2.5V) honeycomb 0.5 in. thick with a 0.25 in. cell size was acid etched, primed with the corresponding PETAA/NMP solution and dried at 100° and 225° C. for 1 h each.

Lap shear specimans were fabricated at 350° C. for 1 h under several difference pressures. Four tensile shear specimens of each resin were tested according to ASTM D-1002. Honeycomb sandwich panels 12 in.×6 in. were fabricated by bonding titanium honeycomb to titanium face sheets using PETI adhesive tape, and by heating at 350° C. for 1 h under 50 psi. The resulting sandwich panel was cut into 2 in.×2 in. specimens and tested according to ASTM C-297.

Climbing drum peel panels were fabricated using titanium sheets 12 in.×12 in., with thickness of 0.40 in. and 0.010 in. by heating at 350° C. for 1 h at 50 psi. The cured panel was cut into 1 in. wide specimens and tested according to ASTM D-1781.

| Test Condition | Strength, psi |
|---|---|
| Ti/Ti Tensile Shear Strength | |
| 23° C. | 7400 |
| 23° C. after 72 h water boil | 5350 |
| 23° C. after 48 h soak, jet fuel | 7290 |
| 150° C. | 4420 |
| 150° C. after 72 h water boil | 3760 |
| 177° C. | 3900 |
| 177° C. after 72 h water boil | 3740 |
| 177° C. after 5000 h at 177° C., air | 4100 |
| Flatwise Sandwich Tensile Strength | |
| −54° C. | 972 |
| 23° C. | 856 |
| 150° C. | 710 |
| 177° C. | 609 |

| Climbing Drum Peel Strength | |
|---|---|
| Test Condition | Strength, in. lb/in. |
| −54° C. | 33.4 |
| 23° C. | 32.9 |
| 177° C. | 38.8 |

EXAMPLE 23

Composites were prepared in the following manner. Unidirectional prepregs (tapes) were prepared by coating unsized IM-7 carbon/graphite fiber on a tape machine with 30% NMP solutions of the PETAA of LARC™-PETI. The volatile contents of the tapes varied from 7 to 12% and were controlled by the residence time and temperature of an in-line furnance in the tape machine. Resin content in the tapes (minus volatiles) varied from 31 to 34% by weight. Small composites (3 in.×6 in.×8 to 16 plies) were fabricated in a stainless steel mold by heating to 350° C. under 200 psi and holding at 350° C. under 200 psi for 1 h. Larger laminates (6 in.×6 in.×16 to 32 plies) were fabricated in an autoclave by heating to 350° C. under 200 psi and holding for 1 h at 350° C. under 200 psi.

The composite panels were ultrasonically scanned (C-scanned) to show no voids, cut into specimens and tested for flexural properties according to ASTM D790, short beam shear strength according to ASTN D2344 and compression strength according to ASTM D3410 Procedure B.

| Unidirectional IM-7 Laminate Properties of LARC ™-PETI-1 | |
|---|---|
| Test Temperature, °C. | |
| | Flexural St, Ksi (Modulus, Msi) |
| 23 | 271 |
| 177 | 21.7 |
| | Short Beam Shear St., KSI |
| 23 | 16.2 |

-continued

Unidirectional IM-7 Laminate Properties of LARC ™-PETI-1

| Test Temperature, °C. | |
|---|---|
| 177 | 8.0 Compressive St., Ksi |
| 23 | 197 |

We claim:

1. A phenylethynyl amine having the general structure:

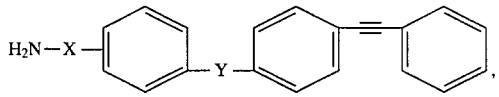

wherein X is a bond or X is a meta or para substituted phenoxy group, and Y is an activating selected from the group selected consisting of $C(CF_3)_2$, CO, and $SO_2$.

2. A phenylethynyl amine according to claim 1 having a specific structure selected from the group consisting of:

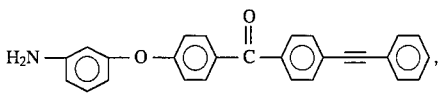

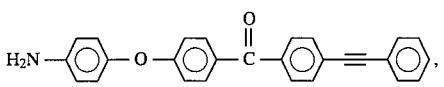

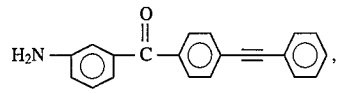

and

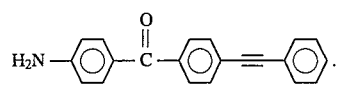

* * * * *